United States Patent [19]
Bringley et al.

[11] Patent Number: 5,427,868
[45] Date of Patent: Jun. 27, 1995

[54] RADIOGRAPHIC PHOSPHOR PANEL HAVING BINDER COMPATIBLE OXOSULFUR STABILIZER AND METHOD FOR PREPARING PHOSPHOR PANEL

[75] Inventors: Joseph F. Bringley; Barbara J. Fisher; Andrea M. Hyde, all of Rochester; Philip S. Bryan, Webster; Luther C. Roberts, Rochester, all of N.Y.

[73] Assignee: Eastman Kodak Company, Rochester, N.Y.

[21] Appl. No.: 157,796

[22] Filed: Nov. 24, 1993

[51] Int. Cl.[6] ............................................. C09K 11/61
[52] U.S. Cl. ................................... 428/691; 428/690; 156/67; 250/484.2; 250/483.1; 252/301.4 H; 252/301.4 S
[58] Field of Search ................ 252/301.4 H, 301.4 S; 250/484.2, 483.1; 428/691, 690; 156/67

[56] References Cited

U.S. PATENT DOCUMENTS

| | | | |
|---|---|---|---|
| 2,502,529 | 4/1950 | Murray | 95/28 |
| 2,887,379 | 5/1959 | Blake et al. | 96/82 |
| 3,023,313 | 2/1962 | De La Mater et al. | 252/301.4 H |
| 3,300,310 | 1/1967 | Kennard et al. | 96/82 |
| 3,300,311 | 1/1967 | Kennard et al. | 96/82 |
| 3,617,285 | 11/1971 | Staudenmayer | 96/82 |
| 3,743,833 | 7/1973 | Martic et al. | 250/483 |
| 3,836,784 | 9/1974 | Bates et al. | 250/483 |
| 3,836,784 | 9/1974 | Bates et al. | 250/483.1 |
| 4,076,897 | 2/1978 | Joiner | 252/301.4 H |
| 4,360,571 | 11/1982 | Rabatin | 428/691 |
| 4,374,905 | 2/1983 | Rabatin | 428/691 |
| 4,380,702 | 4/1983 | Takahashi et al. | 250/327.2 |
| 4,491,736 | 1/1985 | Teraoka | 250/484.1 |
| 4,501,796 | 2/1985 | Kitada | 428/691 |
| 4,505,989 | 3/1985 | Umemoto et al. | 428/691 |
| 4,912,333 | 3/1990 | Roberts et al. | 250/483.1 |
| 4,926,047 | 5/1990 | Takahashi et al. | 252/301.4 H |
| 5,077,144 | 12/1991 | Takahashi et al. | 252/301.4 H |

FOREIGN PATENT DOCUMENTS

0234385B1 9/1991 European Pat. Off. .
2017140 10/1979 United Kingdom .

OTHER PUBLICATIONS

*Research Disclosure,* vol. 154, Feb. 1977, Item 15444.
*Research Disclosure,* vol. 176, Dec. 1978, Item 17643, Section XVII.
*Research Disclosure,* vol. 184, Aug. 1979, Item 18431, Section I.
H. Distler, *Angew Chem.,* (Intl. Ed.), vol. 6, 1967, p. 554.
Peak & Watkins, *J. Chem. Soc.,* (London), 1951, p. 3292.

*Primary Examiner*—Charles R. Nold
*Attorney, Agent, or Firm*—Robert Luke Walker

[57] ABSTRACT

A radiographic phosphor panel having binder compatible oxosulfur stabilizer and a preparation method. The phosphor panel has a support and a luminescent layer overlaying the support. The luminescent layer includes phosphor crystals, binder and an oxosulfur reducing agent. The oxosulfur reducing agent is dispersed within the luminescent layer on a substantially molecular basis. The oxosulfur reducing agent is a reducing agent for iodine. The oxosulfur reducing agent has a concentration sufficient to substantially increase the photostimulated luminescence of the panel.

23 Claims, 2 Drawing Sheets

RADIOGRAPHIC PHOSPHOR PANEL HAVING BINDER COMPATIBLE OXOSULFUR STABILIZER AND METHOD FOR PREPARING PHOSPHOR PANEL

FIELD OF THE INVENTION

The invention relates to radiographic phosphor panels and methods related to their use. The invention more particularly relates to image storage panels and prompt emission panels having binder compatible oxosulfur stabilizing agent and to methods for stabilizing radiographic phosphor panels.

BACKGROUND OF THE INVENTION

A radiographic phosphor panel contains a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conventional screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Degradation of final images due to panel discoloration has long been recognized for intensifying screens. There has not, however, been agreement as to the source of that discoloration. What has been noticed is that screens subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40-59 and U.S. Pat. No. 4,360,571, column 1, lines 46-64). Great Britain Patent Application No. GB 2 017 140 A states:

"[I]t has been discovered that screens containing lanthanum-oxy-halide phosphors tend to discolor rapidly when in use and in particular when held in contact with an X-ray film, . . .

"Gadolinium-oxy-halides are similar . . .

"In spite of intensive research into this discolouration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.

"Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film." (page 1, lines 14-33)

U.S. Pat. No. 4,374,905, to Rabatin, teaches a solution to both discoloration by "volatile organic constituents" and attack by water. The phosphor for an intensifying screen was milled with anhydrous $MgSO_4$ or $ZnSO_4$ (0.5 to 4 weight percent) during preparation of the screen. It was proposed that the protective action was based upon the reaction:

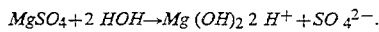

$$MgSO_4 + 2\,HOH \rightarrow Mg(OH)_2\,2\,H^+ + SO_4^{2-}.$$

U.S. Pat. No. 3,836,784, to Bates et al, teaches that small amounts of "stabilizers", such as sodium thiosulfate or potassium thiosulfate can be included in the fluorocarbon binder of an intensifying screen. Bates et al, which used an iodide containing phosphor, noted:

"[A]ctivated iodide phosphors are extremely hygroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

"Various ways have been taught for using thallium activated potassium iodide and protecting the iodide from moisture." (Bates et al, column 1, lines 20-30)

U.S. Pat. No. 3,023,313 to De La Mater et al teaches the use of small amounts of sodium thiosulfate or potassium thiosulfate in the binder of an intensifying screen. Examples list 2 grams and 6 grams of sodium thiosulfate per 200 grams of potassium iodide phosphor.

In U.S. Pat. No. 4,360,571, to Rabatin, phosphors were treated with fatty acids or metal salts of fatty acids to prevent discoloration by "volatile organic constituents" and attack by water. In GB 2 017 140 A, intensifying screens were stabilized against discolouration and hydrolysis by incorporation of a compound containing a free epoxy group and, optionally, a dialkyl tin compound such as dibutyl tin dioctyl as an additional stabilizer.

Radiation image storage panels, unlike intensifying screens, are subject to degradative losses of both emitted light and stimulating radiation. Since these effects are cumulative, discoloration can be an even more serious issue in storage panels than in intensifying screens.

Yellowing of a phosphor layer of a radiation image storage phosphor panel, in which the phosphor contains iodine, is described in European Patent Specification No. EP 0 234 385 B1. The yellowing is ascribed to liberation of free iodine. The solution taught for the yellowing problem, is incorporation in the phosphor layer of a compound containing a free epoxy group and/or a compound selected from: phosphites, organotin compounds, and metal salts of organic acids, specifically: octylic acid, lauric acid, stearic acid, oleic acid, ricinoleic acid naphthenic acid, 2-ethylhexanoic acid, resin acid, synthetic carboxylic acid, benzoic acid, salicylic acid, organic phosphinous acid, phenol, and alkylphenol.

It would be desirable to provide improved prompt emission and radiation image storage panels with stability against yellowing and improved methods for preparing radiographic phosphor panels.

SUMMARY OF THE INVENTION

The invention, in its broader aspects, provides a radiographic phosphor panel having binder compatible oxosulfur stabilizer and a preparation method. The phosphor panel has a support and a luminescent layer overlaying the support. The luminescent layer includes phosphor crystals, binder and an oxosulfur reducing agent. The oxosulfur reducing agent is dispersed within the luminescent layer on a substantially molecular basis. The oxosulfur reducing agent is a reducing agent for iodine. The oxosulfur reducing agent has a concentration sufficient to substantially increase the photostimulated luminescence of the panel.

It is an advantageous effect of at least some of the embodiments of the invention that radiation image storage panels and prompt emission panels and methods for stabilizing phosphor panels are provided which exhibit improved performance and enhanced stabilization against yellowing.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DESCRIPTION OF PARTICULAR EMBODIMENTS

Figure 1:
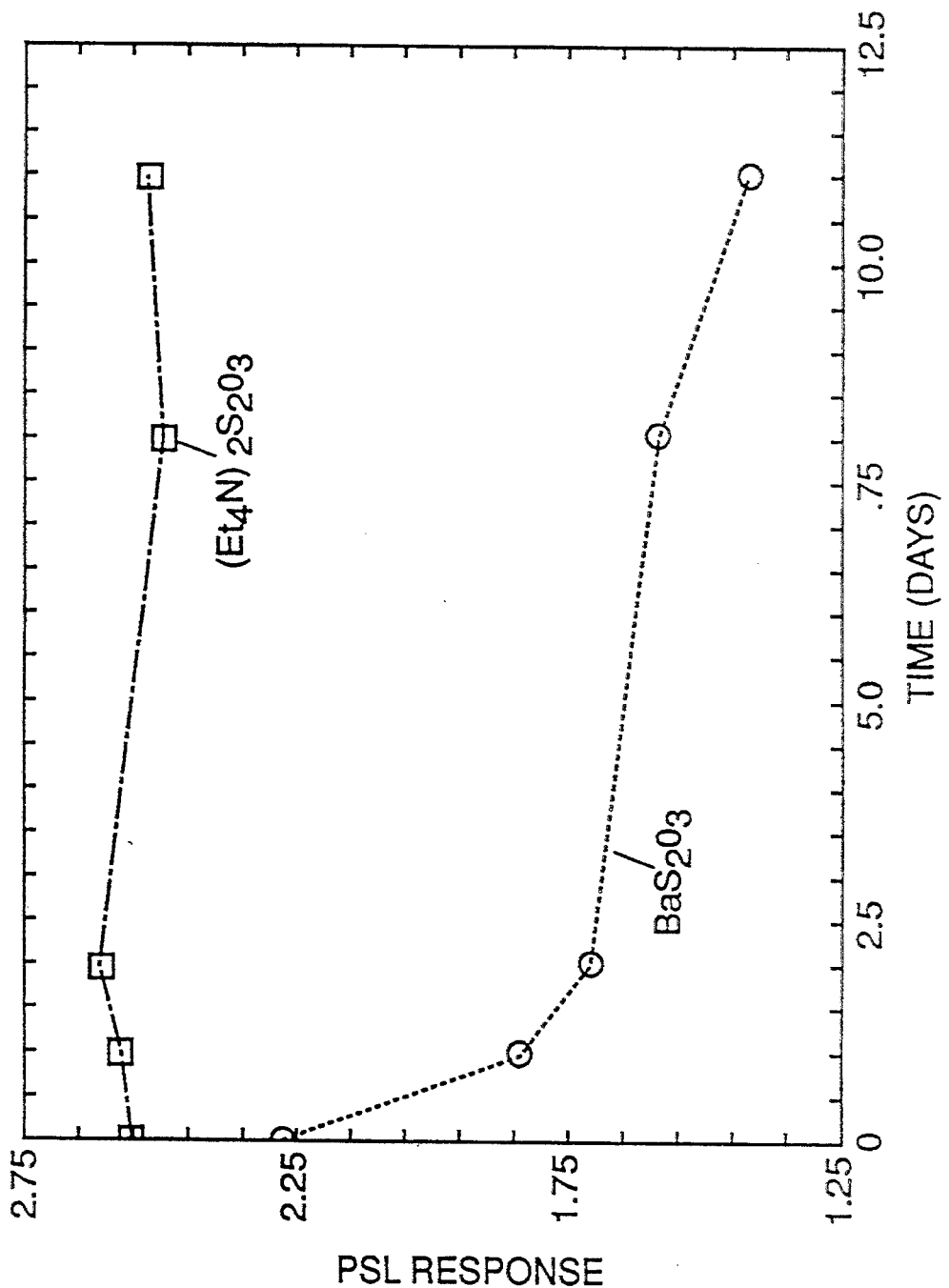
FIG. 1 is a graph of the results of Example 4 and Comparative Example 2. Aging times for panel samples (in days) are graphed versus photostimulated response (actual values). Readings for Example 4 are represented by boxes. Readings for Comparative Example 2 are represented by circles.

The radiographic phosphor panel of the invention comprises a support and a luminescent layer which includes phosphor crystals. The luminescent layer or a layer adjoining the luminescent layer includes a binder-compatible oxosulfur reducing agent. The following description is primarily directed to radiographic image storage panels, however, the invention is not limited to storage panels; but is also applicable to prompt emission panels such as intensifying screens.

The terms "oxosulfur reducing agent" and "oxosulfur reducing agent for molecular iodine" are used to designate oxygen-and-sulfur-containing species capable of reducing free (molecular) iodine according to the half-reaction:

$$I_2 + 2e^- \rightarrow 2I^-.$$

Oxosulfur reducing agents include a moiety or ion of the general formula $$S_jO_k,$$

where j and k are positive integers such that the ratio, j/k is defined by $$0.25 < j/k < 1.0.$$

This formula is inclusive of species in which $S_jO_k$ is a free ion and species in which $S_jO_k$ is a charge bearing moiety covalently linked to another group. The terms "oxosulfur reducing agent" and the like are similarly inclusive of both uncharged species and charged anions. Where a distinction is necessary, for example, between a salt and its disassociated ion, it will be understood from context.

The oxosulfur reducing agent is binder-compatible. The term "binder-compatible" is used herein to indicate that the oxosulfur reducing agent is not dispersed in particulate form in the binder, but rather is dispersed on a molecular basis or on a substantially molecular basis. Binder-compatible is, for example, inclusive of what is sometimes referred to as a "solid solution" of oxosulfur reducing agent in binder. The term "binder-compatible" is also, for example, inclusive of a solid solution within one phase of a two phase system. The oxosulfur reducing agent and binder, necessarily, have solubility properties in common. Both oxosulfur reducing agent and binder can be dissolved in the same solvent and then solvent-cast to form a single substantially uniform layer. In the phosphor panel, the oxosulfur reducing agent and binder provide a solvent-cast matrix for the phosphor and any other particulate addenda. For an organic polymer binder, binder-compatible oxosulfur reducing agents include organic salts of oxosulfur anions having the formula, $S_jO_k$, and Bunte compounds.

Organic salt oxosulfur reducing agents commonly have the general formula:

$$DS_jO_k$$

in which D is the organic cation chosen such that charge neutrality is obeyed. $S_jO_k$ ions of these oxosulfur reducing agents include: $SO_3^{2-}$, $S_2O_4^{2-}$, $S_2O_3^{2-}$, $S_2O_5^{2-}$, and $S_4O_6^{2-}$. $S_jO_k$ ions do not include $SO_4^{2-}$, $SO_5^{2-}$, and $S_2O_8^{2-}$, since these ions do not meet the above-indicated j/k ratio and are not reducing agents for molecular iodine.

In a particular embodiment of the invention, the oxosulfur reducing agent for iodine includes the thiosulfate moiety $S_2O_3^{2-}$, which can be represented by the formula:

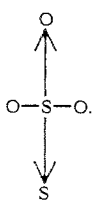

The central atom of sulfur has an oxidation number of 6+ and the outer sulfur atom has an oxidation number of 2−. Thiosulfate reacts with free (molecular) iodine in accordance with the following equation:

In another particular embodiment of the invention, the oxosulfur reducing agent is a polythionate. Polythionate ions are often represented by the general formula:

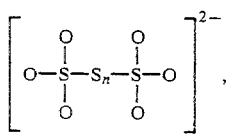

where n is from 1 to 22 or higher. The polythionate: $S_4O_6^{2-}$, which is commonly known as tetrathionate, is a product of the reaction of thiosulfate and free iodine.

The organic cation "D" in the $DS_jO_k$ salts can be selected on the basis of convenience, non-toxicity, non-hygroscopicity, solubility in the solvent for a particular binder and non-interference with the desired characteristics of the panel produced. It is generally preferred that the oxosulfur reducing agent and the product of its reaction with iodine, be colorless, however, some coloration, within a suitable wavelength range could be accommodated. High solubility of the oxosulfur reducing agent in the binder solvent is believed to help assure a uniform distribution of the oxosulfur reducing agent. Results with Bunte salts, discussed below, indicate that increased solubility in solvent for the binder is correlated with a decreased rate of yellowing, that is, greater stability over time. This phenomenon is not understood and seems to be counter-intuitive, particularly in view of the high volatility of free iodine. Suitable organic cations include quaternary ammonium salts, quaternary phosphonium salts, iminium salts and other complex organic and organo-metallic cations. Specific examples of the these cations include: tetraethylammonium, tetrabutylammonium, and bis(triphenylphosphine)iminium. A specific example of a binder-compatible $DS_jO_k$ salt oxosulfur reducing agent is bis(tetraethylammonium) thiosulfate, $((CH_3CH_2)_4N)_2S_2O_3$.

Bunte compounds or Bunte salts have the general structure:

Bunte compounds reduce free iodine in reaction schemes like the following:

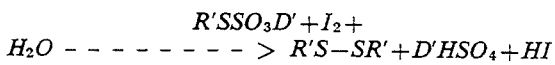

In the above equations, R′ is a covalently bonded organic substituent and D′ is a counterion.

Suitable R′ groups include primary and secondary alkyl, having from 1 to 20 carbons. R′ can be substituted or unsubstituted. Substitutents should not cause deleterious effects, such as increased risk of toxicity. Substitutents can be inert, that is non-reactive with other materials during preparation and use of the panel or, can be a basic organic group capable of reacting with HI. Suitable basic organic groups include $SO_2$; $COOR^1$, where $R^1$ is an organic or inorganic cation; $NR^2$, where each $R^2$ is independently H or substituted or unsubstituted alkyl, aryl, or heteroaryl. It is believed that the basic organic group plays a role in the stabilization of the screen by scavenging unstable hydriodic acid (HI), which is a by product of the reaction of Bunte compounds with iodine. For example, the carboxylate group reacts with HI according to the equation:

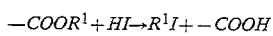

In the above reaction HI, which is known to be unstable towards oxidation, is converted to the more stable $R^1I$ The counterion D′ in the oxosulfur reducing agent formulas above, can be a simple inorganic cation or a complex organic or inorganic cation. D′ can be selected on the basis of convenience, non-toxicity, non-hygroscopicity, solubility in the solvent for a particular binder and non-interference with the desired characteristics of the panel produced. Suitable D′ cations include the organic cations discussed above and simple inorganic cations.

The Bunte compound is normally chosen so that the Bunte compound itself and the products of the reaction with iodine are colorless in the region 350–750 nanometers, so as to prevent the coloration of the screen and the associated degradation of its performance. The products of the reaction with iodine, neutrality, should also be stable toward water, air, light and heat.

Specific examples of suitable Bunte compounds include: $CH_3(CH_2)_4S_2O_3Na$, $Mg(O_2C(CH_2)_4S_2O_3Na)_2$, $Mg(S_2O_3CH_2CH_2NH_2)_2$, $KO_2C(CH_2)_4S_2O_3K$, $NaO_2C(CH_2)_7S_2O_3Na$, and $Mg(O_2C(CH_2)_4S_2O_3)$.

Bunte compounds can be produced by the sulfonatothio-de-halogenation of alkyl halides with thiosulfate or by one of the many methods disclosed in H. Distler, Angew. Chem. (Intl. Ed.), Vol. 6, (1967) p. 554.

The concentration of oxosulfur reducing agent in the luminescent layer and/or the overcoat layer of the phosphor panel of the invention is sufficient to increase the photostimulated luminescence relative to a control panel lacking oxosulfur reducing agent. There is theoretically no upper limit on the concentration of oxosulfur reducing agent in the layers of the panel, however, deterioration of panel characteristics at very high concentrations of oxosulfur reducing agent is expected, if, by no other means than displacement of phosphor or binder. Convenient concentrations of oxosulfur reducing agent are a fractional or few weight percent relative to the weight of the phosphor, or a range of about 0.1 to about 10.0 weight percent relative to the weight of the phosphor.

In particular embodiments of the invention, it may be desirable to add white pigment. This use of white pigment is unrelated to stabilization against yellowing unless an oxosulfur reducing pigment is utilized as the white pigment as disclosed in a U.S. Patent Application filed concurrently with this application, by Joseph F. Bringley, Philip S. Bryan, and Andrea M. Hyde, entitled: PIGMENT STABILIZED RADIATION IMAGE STORAGE PANEL AND METHOD FOR PREPARING RADIATION IMAGE STORAGE PANEL, the disclosure of which is hereby incorporated herein by reference. Suitable pigments, are well known to those skilled in the art and include materials such as titania and barium sulfate. White pigments have been utilized in the art to increase resolution at the expense of speed.

The phosphor in the storage panel can be chosen from radiographic phosphors generally, however, the advantage provided by the oxosulfur reducing agent is stabilization against the kind of discoloration associated with iodine containing phosphors. Thus a storage phosphor should be selected which includes iodine, for example, divalent alkaline earth metal fluorohalide storage phosphors containing iodine and alkali metal halide storage phosphors containing iodine. A mixture of phosphors, at least one of which contains iodide, could also be used, if desired, to form a panel having optimal properties for a particular application. Panel constructions containing more than one phosphor-containing layer are also possible, with iodine containing phosphors being present in one or more of the phosphor-containing layers.

In particular embodiments of the invention, the phosphor is a storage phosphor which is the product of firing starting materials comprising a combination of species characterized by the relationship:

$$MFX_{1-z}I_z uM^a X^a{:}yA{:}eQ{:}tD,$$

where M is selected from Mg, Ca, Sr, and Ba; X is selected from Cl and Br; $M^a$ is selected from Na, K, Rb, and Cs; $X^a$ is selected from Cl, Br, and I; A is selected from Eu, Ce, Sm, and Tb; Q is an oxide selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; and D is selected from V, Cr, Mn, Fe, Co, and Ni. Numbers are represented by the following: z is from $1 \times 10^{-4}$ to 1, u is from 0 to 1, y is from $1 \times 10^{-4}$ to 0.1, e is from 0 to 1, or more preferably from $10^{-5}$ to 0.1, and t is from 0 to $10^{-2}$. The same designations appearing elsewhere herein have the same meanings unless specifically stated to the contrary. Groups of materials, for example the materials defined by M, are to be understood as inclusive of combinations of materials in that group.

In some of those embodiments of the invention, the panel includes a divalent alkaline earth metal fluorohalide storage phosphor containing iodine which is the product of firing an intermediate, a combination of species characterized by the relationship:

$$(Ba_{1-a-b-c}Mg_aCa_bSr_c)FX_{1-z}I_z rM^a X^a{:}yA{:}eQ$$

where X, $M^a$, $X^a$, A, Q, z, y, and e have the same meanings as in formula (1) and the sum of a, b, and c is from 0 to 0.4, and r is from $10^{-6}$ to 0.1. In a particular embodiment of the invention, $M^a$ is potassium and the storage phosphor is further characterized as disclosed in a U.S. Patent Application filed concurrently with this application, by Joseph F. Bringley, Philip S. Bryan and Andrea M. Hyde, entitled: ALKALINE EARTH METAL FLUOROBROMOIODIDE STORAGE PHOSPHOR AND RADIATION IMAGE STORAGE PANEL, the disclosure of which is hereby incorporated herein by reference.

In a particular embodiment of the invention, the phosphor is produced utilizing an oxosulfur reducing agent containing storage phosphor intermediate, disclosed in a U.S. Patent Application filed concurrently with this application, by Joseph F. Bringley, Philip S. Bryan and Andrea M. Hyde, entitled: STABILIZED PHOSPHOR INTERMEDIATES, STORAGE PHOSPHORS, RADIATION IMAGE STORAGE PANELS, AND PREPARATION METHODS; (hereafter referred to as "Stabilized Phosphor Intermediates" Application), the disclosure of which is hereby incorporated herein by reference. The stabilized phosphor intermediate disclosed therein and its resulting phosphor have increased photostimulated luminescence in comparison to unstabilized controls. It has been determined by the applicants that the increased photostimulated luminescence provided thereby is cumulative with the increased photostimulated luminescence provided in the claimed invention.

The oxosulfur reducing agent utilized in the Stabilized Phosphor Intermediates Application can be selected from the oxosulfur reducing agents disclosed herein or can be an inorganic oxosulfur pigment, such as barium thiosulfate. Care is taken in the selection of inorganic cations so as to not cause deleterious effects on the phosphor produced. Storage panels incorporating such inorganic oxosulfur reducing pigments are disclosed in a U.S. Patent Application filed concurrently with this application, by Joseph F. Bringley, Philip S. Bryan, and Andrea M. Hyde, entitled: PIGMENT STABILIZED RADIATION IMAGE STORAGE PANEL AND METHOD FOR PREPARING RADIATION IMAGE STORAGE PANEL, the disclosure of which has been incorporated herein by reference.

In the inventive phosphor of the Stabilized Phosphor Intermediates Application, the oxosulfur reducing agent is present in the unfired intermediate for the phosphor in an amount sufficient to increase relative photostimulated luminescence in the fired phosphor relative to the same phosphor absent said reducing agent for iodine. In a particular embodiments of the Stabilized Phosphor Intermediates Application, the phosphor has the general structure $$MFX_{1-z}I_z uM^a X^a{:}yA{:}eQ{:}tD$$

or $(Ba_{1-a-b-c}Mg_aCa_bSr_c)FX_{1-z}I_z rM^a X^a{:}yA{:}eQ$ in which these formulas have the same meanings as discussed above and the oxosulfur reducing agent is present in the intermediates in a molar ratio of sulfur to alkaline earth metal of greater than $1 \times 10^{-4}$ and less than 0.020.

The luminescent layer of the phosphor panel of the invention contains a polymeric binder to give it structural coherence. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); linear polyesters; and poly- (urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage panels, it is preferable to include a dye or pigment which absorbs some of the stimulating radiation, generally provided by a laser; but mostly reflects emitted light. U.S. Pat. No. 4,491,736 to Teraoka teaches the use of such materials in storage panels.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

An overcoat layer, although not required, is commonly located over the luminescent layer for humidity and wear protection. If the panel includes an overcoat layer, the oxosulfur reducing agent can be located in the overcoat layer or the luminescent layer or both. The overcoat layer comprises a binder chosen using the criteria described above for the binder in the luminescent layer. It is understood that the binder used in the overcoat layer, and the binder forming the matrix in which the phosphor particles are held, are preferably formed of transparent resins that do not interfere with the passage of x-rays or stimulating radiation or the emitted light from the phosphors. The overcoat binder can be the same binder as in the luminescent layer or different and can also be chosen from polymers useful for supports. Since it is generally required that the overcoat layer exhibit toughness and scratch resistance, polymers conventionally employed for film supports are favored. For example, cellulose acetate is an overcoat commonly used with the poly(urethane) binders. Overcoat polymers are often used also to seal the edges of the phosphor layer. In a preferred embodiment of the invention, the overcoat is produced in accordance with a U.S. Patent Application filed concurrently with this application, by Luther C. Roberts, entitled: OVERCOATED RADIATION IMAGE STORAGE PANEL AND METHOD FOR PREPARING RADIATION IMAGE STORAGE PANEL, the disclosure of which is hereby incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration, that is, to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in *Research Disclosure*, Vol. 184, August 1979, Item 18431, hereby incorporated herein by reference.

The radiographic panels of the invention are formed by conventional coating techniques. Phosphor powder, oxosulfur reducing agent and other addenda are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel.

The following Examples and Comparative Examples are presented to further illustrate and elucidate some preferred modes of practice of the invention. Unless otherwise indicated, all starting materials were commercially obtained.

The thiosulfate salts were obtained commercially except as follows.

Bis(tetraethylammonium) thiosulfate and bis(tetrabutylammonium) thiosulfate were prepared by the following general procedure as in the following equation:

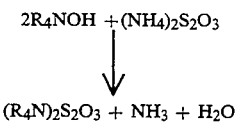

A known amount of tetraalkyl ammonium hydroxide in aqueous or methanol solution was carefully measured, and then diluted by an equal volume of the appropriate solvent. An amount of ammonium thiosulfate corresponding to one-half the number of moles of the tetraalkyl ammonium hydroxide was then added and the solution evaporated to dryness, thus removing the water, $NH_3$ and solvent. The product was then dried in vacuo over phosphorous pentoxide.

Bis(triphenylphosphine)iminium thiosulfate was prepared as follows: 20.00 grams of triphenylphosphine iminium chloride was dissolved in 400 ml of water and heated to 80° C. 200.0 grams of sodium thiosulfate was dissolved in 200 ml water and heated to 80° C. The two solutions were then combined whereupon a precipitate immediately formed. The mixture was then allowed to cool to 30°-40° C. and the precipitate recovered by vacuum filtration. The precipitate was washed with 500 ml of cold water to remove any residual sodium chloride and allowed to air dry.

Bunte Compounds: Bunte compounds were prepared by a variation on the procedure reported by Peak and Watkins, *J. Chem Soc.* (London) 1951, p.3292, for sodium octylthiosulfate. A representative procedure is given below.

Magnesium Bis(valerate-5-thiosulfate sodium): Into an erlenmeyer flask containing a magnetic stir bar and 50 ml of a 50:50 (volume/volume) mixture of ethanol/water was dissolved 6.82 grams of 5-chlorovaleric acid with stirring. Magnesium carbonate (2.41 grams) was then added and an additional 75 ml of the 50:50 ethanol/water and the contents refluxed for 1 hour. After that time the solution was clear and nearly colorless. Sodium thiosulfate pentahydrate (12.40 grams) was then added and the refluxing continued for another hour. The solvent was then removed on a rotary evaporator leaving an oily liquid. Isopropyl alcohol (100 ml) was then added to the oil with vigorous shaking, at which time a white precipitate appeared, which was then isolated by filtration. The Bunte compound was then extracted with methanol and the solvent removed on a rotary evaporator. The yield was about 90%.

$BaS_2O_3 \cdot H_2O$ was prepared according to the following equation:

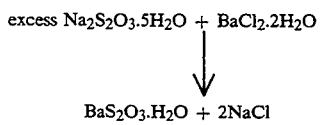

In a typical procedure, barium chloride dihydrate was dissolved in about 2 parts by weight of distilled water and a 2-fold excess of sodium thiosulfate was dissolved separately in about 1.5 parts by weight distilled water. The solutions were filtered to remove insoluble impurities and were then heated to about 40°-50° C. The barium chloride solution was then added via an addition funnel to the thiosulfate solution over about 5 minutes with vigorous stirring, and a white precipitate immediately formed. The precipitate was then collected by vacuum filtration or other means and washed with copious amounts of distilled water to remove any residual sodium chloride by-product. The white solid was then air dried for 24 hours to yield very pure $BaS_2O_3 \cdot H_2O$. The product was then analyzed by powder X-ray diffraction to confirm its identity and purity. The $BaS_2O_3 \cdot H_2O$ was dried at 150° C. for 24 hours yielding $BAS_2O_3$.

The X-ray phosphors used to prepare coatings were prepared by the following general procedures.

Preparation of $BaFBr_{0.80}I_{0.20}{:}0.001Eu^{2+}$.

In a 2000 ml beaker containing a Teflon coated magnetic stir bar, 304.00 grams of $BaBr_2 \cdot 2H_2O$ and 97.45 grams of $BaI_2 \cdot 2H_2O$ were dissolved in 500 ml of distilled water. The solution was then filtered through 0.45 micrometer filter paper and 2.8 ml of a 0.8 M EU(III) solution in 1 Molar aqueous HBr was added. To this solution, 200.0 grams of $BaF_2$ was added slowly with stirring over 60 seconds. The mixture was allowed to stir at 25° C. for 30 minutes and then carefully heated to dryness in a microwave oven over 45-60 minutes. The resulting white cakes were then ground separately with an agate mortar and pestle and placed in 50 ml alumina crucibles. The white powders contained in the crucibles were then heated to 800°-900° C. for 3 hours in a tube furnace containing an atmosphere of dry nitrogen or argon. After cooling in inert atmosphere, the fired phosphor was then ground with an agate mortar and pestle and sieved through a 38 micrometer mesh yielding the finished phosphor.

Preparation of Image Storage Panels:

Image storage panels were prepared by the following general procedure. Phosphor and oxosulfur reducing agent, if any, were dispersed in a 13% (weight/weight) solution of PERMUTHANE ™ U-6366 polyurethane marketed by ICI Polyurethanes Group of West Deptford, N.J. in 93:7 (weight/weight) dichloromethane/methanol solvent. The dispersions were often milled 30 minutes with zirconium oxide beads on a paint shaker. The phosphor to binder ratio was about 15:1. Knife-coatings were prepared on a polyethylene terephthalate support. The knife-coatings were allowed to air-dry to produce luminescent layers. After drying, except where noted, the completed storage panels were overcoated with a polymer solution of cellulose acetate in acetone or with a fluorinated polymer, Kynar 7201 marketed by ELF Atochem North America, Inc., of Bloomington, Min., or equivalent in acetone. For each set of experiments, a comparison example was prepared in an identical manner, except that no amount of stabilizer was added.

The relative photostimulated luminescence (PSL) intensities of the image storage panels were measured by cutting 2.6 centimeter diameter disks from the panels, and simultaneously exposing the sample and a standard to filtered X-radiation. The X-ray source was a tungsten target tube operating at 70 kVp and 3.0 mA.

The filtration consisted of a 3.5 centimeter thickness of aluminum. After exposure to X-rays, the samples and standard were stimulated with a 4-millisecond pulse at 633 nanometers from a 12 mW helium-neon laser. The stimulated emission was detected using a photomultiplier tube after passing through a Schott BG-25 filter. The responses were corrected for X-ray exposure variations by normalizing the measured response in each case to an internal standard. The PSL responses for particular Examples are reported relative to a Comparative Example handled in an identical manner, but which did not contain a oxosulfur reducing agent as stabilizer. The response of the Comparative Example in each case was arbitrarily set equal to 100. The measured PSL responses were corrected for variations in phosphor coverage by dividing by the coverage value determined for that particular disk.

EXAMPLES 1–3

Image storage panels were prepared with $BaFBr_{0.80}I_{0.20}{:}0.001Eu^{2+}$ storage phosphor as above described, without milling. Oxosulfur reducing agents: bis(tetraethylammonium) thiosulfate, bis(tetrabutylammonium) thiosulfate, and bis(triphenylphosphine)iminium thiosulfate, were dispersed in the luminescent layer as indicated in Table 1, by the formulas: $((ethyl)_4N)_2S_2O_3$, $((butyl)_4N)_2S_2O_3$, and $(PPN)_2S_2O_3$, respectively. Concentrations of oxosulfur reducing agents are indicated in Table 1, (and the other tables for other examples and comparative examples), as weight percentages ((wt/wt) %) based upon the weight of the phosphor. The storage panels were then overcoated with cellulose acetate, (applied as an acetone solution). The photostimulated luminescence (PSL) values were measured as above-described and are reported in Table 1.

COMPARATIVE EXAMPLE 1

A storage panel was prepared and evaluated in the same manner and at the same time as Examples 1–3 except no oxosulfur reducing agent was present. Results are presented in Table 1.

EXAMPLE 4

An image storage panel was prepared and evaluated by the same procedures as Example 1, with the exception that no overcoat layer was applied. A sample was then cut from the storage panel and exposed to the ambient environment for aging. Photostimulated luminescence was measured repeated as shown in FIG. 1.

COMPARATIVE EXAMPLE 2

Image storage panels were prepared and evaluated as in Example 4, with the exception that an oxosulfur reducing pigment: $BaS_2O_3$ was added at a concentration of 2 weight percent in Comparative Example 2 instead of a binder-compatible oxosulfur reducing agent. Results are presented in FIG. 1.

COMPARATIVE EXAMPLE 3

Image storage panels were prepared as in Example 4, with the exception that no oxosulfur reducing agent or pigment was added in Comparative Example 3. Yellowing in the ambient environment was too rapid to permit evaluation of photostimulated luminescence as shown for Example 4 and Comparative Example 2 in FIG. 1.

EXAMPLE 5 AND COMPARATIVE EXAMPLES 4–5

Figure 2:
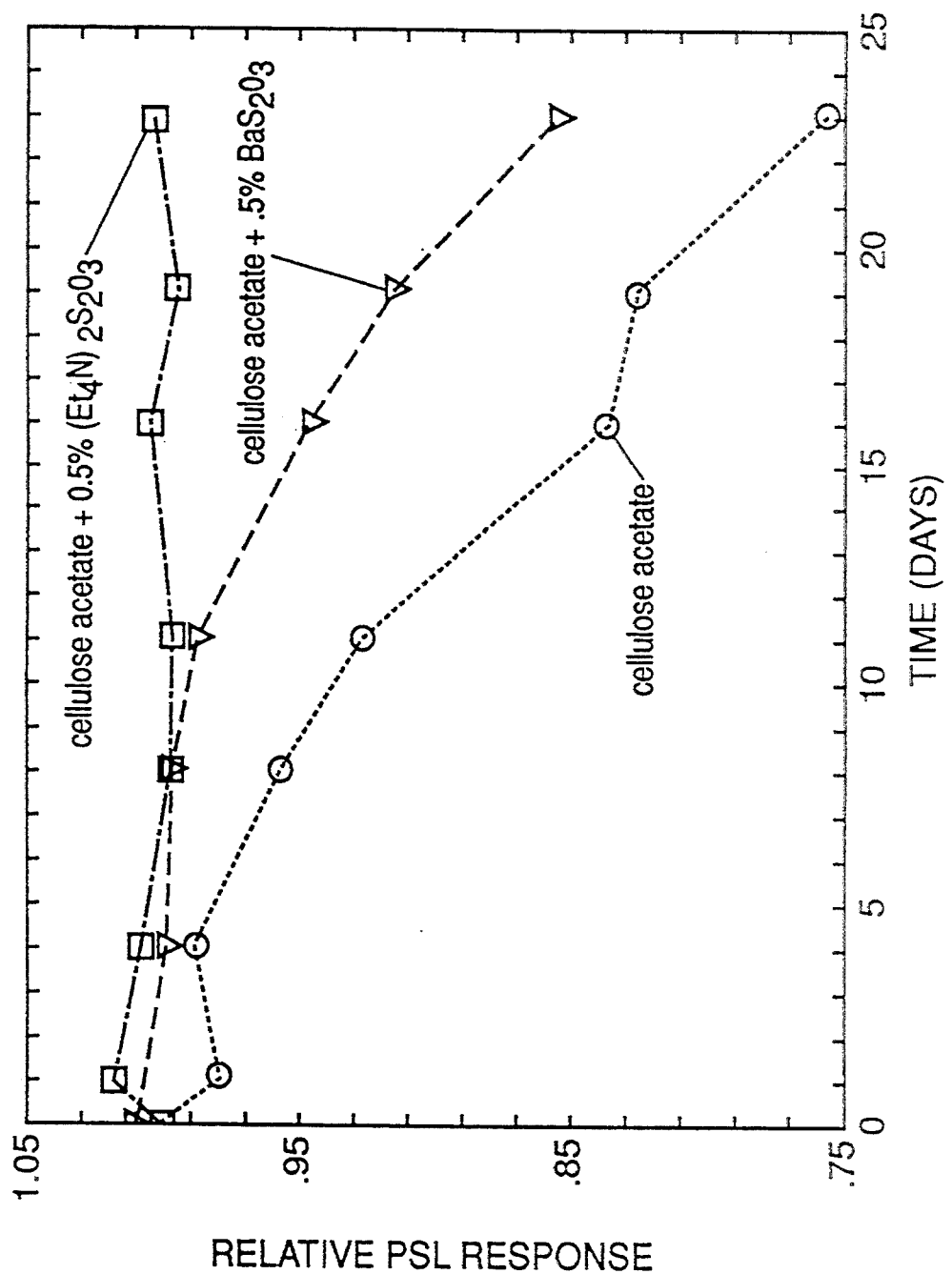
FIG. 2 is a graph of the results of Example 5 and Comparative Examples 4–5. Aging times for panel samples (in days) are graphed versus relative photostimulated response (actual response when tested/actual response at time 0). Readings for Example 5 are represented by boxes. Readings for Comparative Example 4 are represented by triangles. Readings for Comparative Example 5 are represented by circles.

An image storage panel were prepared by the same procedures as in Comparative Example 1, with the exception of the overcoat layer. Separate areas of the panel were then overcoated with the following overcoat solutions: (Example 5) cellulose acetate in acetone+0.5 wt % $((ethyl)_4N)_2S_2O_3$; (Comparative Example 4) cellulose acetate in acetone+0.5 wt % $BAS_2O_3$; and (Comparative Example 5) cellulose acetate in acetone. Samples were cut from the panel for the Example and Comparative Examples and were evaluated in the same manner as in Example 4 after aging at 90° F. and 90% RH. Results as to initial sensitivity are presented in Table 2. Aging results are presented in FIG. 2.

EXAMPLES 6–11

Image storage panels were prepared using $BaFBr_{0.8}I_{0.2}{:}0.001Eu^{2+}$ storage phosphor as in Example 1 except Bunte compounds, as indicated in Table 3, were added as oxosulfur reducing agent. The concentration of Bunte compound added to the binder/phosphor/solvent mixture was 2 weight percent relative to the weight of the phosphor. The panels were then evaluated as in Example 1.

Samples (punches 1 inch in diameter) were taken from the image storage panels of Examples 6–10. The punches were then placed in an environment maintained at 103° F. (±2° F.) and 86% relative humidity.

Results are presented in Tables 3–4. In Table 4, the rate of decay is slope of a graph of the number of PSL response points the image storage panel lost per day. The slope control/slope sample is the ratio of rate of decay of the Comparative Example 6 over the rate of decay of the Example. The "solubility rank" denotes the relative solubility of each of the Bunte compounds in the binder solvent.

COMPARATIVE EXAMPLE 6

A storage panel was prepared and evaluated in the same manner and contemporaneous with Examples 6–11, except no oxosulfur reducing agent was present. Results are presented in Tables 3–4.

TABLE 1

The effect of oxosulfur reducing agents in luminescent layer of $BaFBr_{0.80}I_{0.20}{:}0.001Eu^{2+}$ image storage panels

| Example or Comparative Example | Oxosulfur reducing agent/ pigment | (wt/wt) % added | PSL Response |
|---|---|---|---|
| Example 1 | $((ethyl)_4N)_2S_2O_3$ | 2.0 | 133 |
| Example 2 | $((butyl)_4N)_2S_2O_3$ | 2.0 | 163 |
| Example 3 | $(PPN)_2S_2O_3$ | 2.0 | 146 |
| Comparative Example 1 | — | none | 100 |

TABLE 2

The effect of oxosulfur reducing agents in overcoat layer of $BaFBr_{0.80}I_{0.20}{:}0.001Eu^{2+}$ image storage panels

| Example or Comparative Example | Oxosulfur reducing agent in overcoat | PSL Response |
|---|---|---|
| Example 5 | 0.5 wt % $(Et_4N)_2S_2O_3$ | 127 |
| Comparative Example 4 | 0.5 wt % $BaS_2O_3$ | 110 |
| Comparative | none | 100 |

TABLE 2-continued

The effect of oxosulfur reducing agents in overcoat layer of $BaFBr_{0.80}I_{0.20}:0.001Eu^{2+}$ image storage panels

| Example or Comparative Example | Oxosulfur reducing agent in overcoat | PSL Response |
|---|---|---|
| Example 5 | | |

TABLE 3

The effect of addition of Bunte compounds, upon the speed of image storage panels

| Example or Comparative Example | Bunte compound 2 (wt/wt) % | PSL Response |
|---|---|---|
| Example 6 | $CH_3(CH_2)_4S_2O_3Na$ | 123 |
| Example 7 | $Mg(O_2C(CH_2)_4S_2O_3Na)_2$ | 131 |
| Example 8 | $Mg(S_2O_3CH_2CH_2NH_2)_2$ | 132 |
| Example 9 | $KO_2C(CH_2)_4S_2O_3K$ | 137 |
| Example 10 | $NaO_2C(CH_2)_7S_2O_3Na$ | 136 |
| Example 11 | $Mg(O_2C(CH_2)_4S_2O_3)$ | 153 |
| Comparative Example 6 | none | 100 |

TABLE 4

The effect of Bunte compounds upon the long term keeping stability of image storage panels

| Ex. or Com Ex. | Bunte Compound 2 (wt/wt) % | rate of decay | slope control/ slope sample | sol. rank |
|---|---|---|---|---|
| Ex 6 | $CH_3(CH_2)_4S_2O_3Na$ | −9.8 | 11.6 | 2 |
| Ex 7 | $Mg(O_2C(CH_2)_4S_2O_3Na)_2$ | −4.5 | 25.3 | 1 |
| Ex 8 | $Mg(S_2O_3CH_2CH_2NH_2)_2$ | −7.9 | 14.4 | 3 |
| Ex 9 | $KO_2C(CH_2)_4S_2O_3K$ | −46.6 | 2.4 | 5 |
| Ex 10 | $NaO_2C(CH_2)_7S_2O_3Na$ | −14.1 | 8.1 | 4 |
| Com Ex 6 | none | −114 | 1.0 | — |

The Examples and Comparative Examples demonstrate surprisingly good initial and long term stability for panels incorporating oxosulfur reducing agents which are binder-compatible. The stabilizing or anti-yellowing effect is better than with an oxosulfur reducing pigment. In the claimed invention, the stability improves with increased solubility of the oxosulfur reducing agent in a solvent for the binder material. This mutual solubility in the same solvent for binder and oxosulfur reducing agent is referred to herein by the term "binder-compatible" and reflects a homogeneous dispersion of the oxosulfur reducing agent at a molecular or near molecular level with the binder.

This result is surprising. It might have been predicted that dispersion of the oxosulfur reducing agent was unnecessary, in view of the high volatility of molecular iodine.

A further advantage is presented by using as oxosulfur reducing agent a Bunte compound having a basic organic functional group.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic phosphor panel comprising a support and a luminescent layer overlaying said support, said luminescent layer including phosphor crystals, binder, and an oxosulfur reducing agent, said phosphor crystals including iodine, said oxosulfur reducing agent being dispersed within said luminescent layer on a substantially molecular basis, said oxosulfur reducing agent being a reducing agent for iodine, said oxosulfur reducing agent having a concentration sufficient to substantially increase the photostimulated luminescence of said panel.

2. The radiographic phosphor panel of claim 1 wherein said binder comprises organic polymer and said oxosulfur reducing agent and said binder form a solvent-cast matrix for said phosphor.

3. The radiographic phosphor panel of claim 1 wherein said oxosulfur reducing agent is selected from the group consisting of organic oxosulfur salts having anions having the general formula $S_jO_k$ wherein $0.25 < j/k < 1.0$ and Bunte compounds.

4. The radiographic phosphor panel of claim 1 wherein said reducing agent is selected from the group consisting of: organic salts of $SO_3^{2-}$, $S_2O_4^{2-}$, $S_2O_3^{2-}$, $S_2O_5^{2-}$, and $S_4O_6^{2-}$.

5. The radiographic phosphor panel of claim 4 wherein said reducing agent comprises an organic thiosulfate salt.

6. The radiographic phosphor panel of claim 1 wherein said oxosulfur reducing agent is a Bunte compound.

7. The radiographic phosphor panel of claim 1 wherein said phosphor consists essentially of a combination of species characterized by the relationship:

$$MFX_{1-z}I_zuM^aX^a{:}yA{:}eQ{:}tD$$

wherein
M is selected from the group consisting of Mg, Ca, Sr, and Ba;
X is selected from the group consisting of Cl and Br;
$M^a$ is selected from the group consisting of Na, K, Rb, and Cs;
$X^a$ is selected from the group consisting of F, Cl, Br, and I;
A is selected from the group consisting of Eu, Ce, Sm, and Tb;
Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;
D is selected from the group consisting of V, Cr, Mn, Fe, Co, and Ni;
z is from $1 \times 10^{-4}$ to 1;
u is from 0 to 1;
y is from $1 \times 10^{-4}$ to 0.1;
e is from 0 to 1; and
t is from 0 to $10^{-2}$; and optionally, the product of thermal decomposition of oxosulfur reducing agent for iodine present in an amount sufficient to increase relative photostimulated luminescence intensities relative to the phosphor defined above absent said reducing agent for iodine.

8. The radiographic phosphor panel of claim 7 wherein said oxosulfur reducing agent is selected from the group consisting of oxosulfur compounds having the general formula $S_jO_k$ wherein $0.25 < j/k < 1.0$ and said oxosulfur reducing agent is present prior to said firing in a molar ratio of sulfur to alkaline earth metal of greater than $1 \times 10^{-4}$ and less than 0.020.

9. A radiographic phosphor panel comprising a support, a luminescent layer overlaying said support, and an overcoat layer overlaying said luminescent layer, said overcoat layer comprising organic polymer, said layers each including binder, said binder being organic polymer, at least one of said layers being subject to iodine-related discoloration, said luminescent layer including phosphor crystals, at least one said layer including an oxosulfur reducing agent, said oxosulfur reducing agent being dispersed within one said layer on a substantially molecular basis, said oxosulfur reducing agent being selected from the group consisting of organic oxosulfur salts having anions having the general formula $S_jO_Ok$ wherein $0.25<j/k<1.0$ and Bunte compounds, said oxosulfur reducing agent having a concentration sufficient to substantially increase the photostimulated luminescence of said panel.

10. The radiographic phosphor panel of claim 9 wherein said phosphor is selected from the group consisting of divalent alkaline earth metal fluorohalide phosphors containing iodine and alkali metal halide phosphors containing iodine.

11. The radiographic phosphor panel of claim 9 wherein said phosphor comprises a combination of species characterized by the relationship:

$$MFX_{1-z}I_z{:}uM^aX^a{:}yA{:}eQ{:}tD$$

wherein

M is selected from the group consisting of Mg, Ca, Sr, and Ba;

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$, D is selected from the group consisting of V, Cr, Mn, Fe, Co, and Ni;

z is from $1\times10^{-4}$ to 1;

u is from 0 to 1;

y is from $1\times10^{-4}$ to 0.1;

e is from 0 to 1; and t is from 0 to $10^{-2}$; and thermal decomposition product of oxosulfur reducing agent for iodine, said oxosulfur reducing agent being selected from the group consisting of inorganic and organic salts having moieties having the general formula $S_jO_k$ wherein $0.25<j/k\ 1.0$.

12. The radiographic phosphor panel of claim 11 wherein said combination of species is further characterized by the relationship:

$$(Ba_{1-a-b-c}Mg_aCa_bSr_c)FX1-zI_z{:}rM^aX^a{:}yA{:}eQ$$

wherein

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$;

$a+b+c$ is from 0 to 0.4;

z is from $1\times10^{-4}$ to 1;

r is from $10^{-6}$ to 0.1;

y is from $1\times10^{-4}$ to 0.1; and e is from $10^{-5}$ to 0.1.

13. The radiographic phosphor panel of claim 9 wherein said reducing agent is selected from the group consisting of: organic salts of $SO_3^{2-}$, $S_2O_4^{2-}$, $S_2O_3^{2-}$, $S_2O_5^{2-}$, and $S_4O_6^{2-}$.

14. The radiographic phosphor panel of claim 9 wherein said reducing agent comprises an organic thiosulfate salt.

15. The radiographic phosphor panel of claim 9 wherein said reducing agent is selected from the group consisting of bis(tetraethylammonium) thiosulfate, bis(tetrabutylammonium) thiosulfate, and bis(triphenylphosphine)iminium thiosulfate.

16. The radiographic phosphor panel of claim 9 wherein said reducing agent comprises a Bunte compound.

17. The radiographic phosphor panel of claim 9 wherein said reducing agent is selected from the group consisting of CH$_3$(CH$_2$)$_4$S$_2$O$_3$Na, Mg(O$_2$C(CH$_2$)$_4$S$_2$O$_3$Na)$_2$, Mg(S$_2$O$_3$CH$_2$CH$_2$NH$_2$)$_2$, KO$_2$C(CH$_2$)$_4$S$_2$O$_3$K, NaO$_2$C(CH$_2$)$_7$S$_2$O$_3$Na, and Mg(O$_2$C(CH$_2$)$_4$S$_2$O$_3$).

18. The radiographic phosphor panel of claim 9 wherein said support is substantially rigid.

19. A method for preparing a radiographic phosphor panel comprising forming a plurality of layers on a support, each said layer comprising binder, at least one said layer having radiographic phosphor consisting essentially of a combination of species characterized by the relationship:

$$MFX_{1-z}I_z{:}uM^aX^a{:}yA{:}eO{:}tD$$

wherein

M is selected from the group consisting of Mg, Ca, Sr, and Ba;

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

O is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$, D is selected from the group consisting of V, Cr, Mn, Fe, CO, and Ni;

z is from $1\times10^{-4}$ to 1;

u is from 0 to 1;

y is from $1\times10^{-4}$ to 0.1;

e is from 0 to 1; and t is from 0 to $10^{-2}$; and optionally, the product of thermal decomposition of oxosulfur reducing agent for iodine, at least one said layer having dispersed therein binder-compatible oxosulfur reducing agent having a concentration sufficient to substantially increase the photostimulated luminescence of said panel, said oxosulfur reducing agent being a reducing agent for iodine, said oxosulfur reducing agent being selected from the group consisting of organic oxosulfur salts having anions of the general formula $S_jO_k$ wherein $0.25 < j/k < 1.0$ and Bunte compounds.

20. The method of claim 19 further comprising solvent casting together said oxosulfur reducing agent and binder for one of said layers.

21. The radiographic phosphor panel of claim 1 wherein said oxosulfur reducing agent has the general structure:

$$R'SSO_3D',$$

wherein

R' is primary or secondary alkyl, having from 1 to 20 carbons, and is unsubstituted or substituted with a basic organic group capable of reacting with HI, and D' is a counterion.

22. The radiographic phosphor panel of claim 21 wherein R' is substituted by $SO_2$, $COOR^1$, or $NR^2$, wherein $R^1$ is an organic or inorganic cation and $R^2$ is H or substituted or unsubstituted alkyl, aryl, or heteroaryl.

23. The radiographic phosphor panel of claim 6 wherein said Bunte compound and the products of reacting said Bunte compound with iodine are colorless in the region 350–750 nanometers.

* * * * *

UNITED STATES PATENT AND TRADEMARK OFFICE
CERTIFICATE OF CORRECTION

PATENT NO. : 5,427,868
DATED : June 27, 1995
INVENTOR(S) : Joseph F. Bringley, et al It is certified that error appears in the above-indentified patent and that said Letters Patent is hereby corrected as shown below:

Column 17, line 12, after "formula" delete "$S_j O_{ok}$" and insert --$S_j O_k$--.

Signed and Sealed this

Nineteenth Day of December, 1995

Attest:

BRUCE LEHMAN

*Attesting Officer*    *Commissioner of Patents and Trademarks*